United States Patent [19]

Lindquist

[11] 4,062,984
[45] Dec. 13, 1977

[54] REMOVAL OF AFLATOXIN FROM PEANUTS

[75] Inventor: Robert H. Lindquist, Berkeley, Calif.

[73] Assignee: Chevron Research Company, San Francisco, Calif.

[21] Appl. No.: 608,591

[22] Filed: Aug. 29, 1975

Related U.S. Application Data

[63] Continuation-in-part of Ser. No. 506,374, Sept. 16, 1974, abandoned.

[51] Int. Cl.$^2$ .................................................. A23L 1/36
[52] U.S. Cl. ................................... 426/430; 260/412.4
[58] Field of Search ........................ 426/430, 332, 417; 260/123.5, 412.4

[56] References Cited

U.S. PATENT DOCUMENTS

| | | | |
|---|---|---|---|
| 2,191,455 | 2/1940 | Davis | 260/412.4 |
| 2,494,928 | 1/1950 | Cohen | 426/430 |
| 2,542,119 | 2/1951 | Cole | 426/417 |
| 2,563,233 | 8/1951 | Gilmont | 426/430 |
| 2,605,271 | 7/1952 | Hunn | 260/412.4 |
| 3,294,549 | 12/1966 | Vix | 426/417 X |
| 3,515,736 | 6/1970 | Goldblatt | 260/412.4 |
| 3,520,868 | 7/1970 | Henderson | 260/123.5 R |
| 3,795,750 | 3/1974 | Levine | 426/332 |

FOREIGN PATENT DOCUMENTS

| | | | |
|---|---|---|---|
| 518,493 | 2/1940 | United Kingdom | 426/417 |

OTHER PUBLICATIONS

Reprint from Eco. Botany vol. 22, No. 1 – Jan.–Mar. 1918 51–62, Goldblatt.
Mack, Chem. Dictionary – p. 230, 1944.
JAOCS, Jan. 1964, 41, No. 1, 66–68.
Food Tech., 1957, XI, No. 6, 332–336.
Clinical Toxicology, 5(4), p. 465–494, Analytical Methods for Mycotoxins, L.Stoloff.

*Primary Examiner*—Robert Halper
*Attorney, Agent, or Firm*—D. A. Newell; John Stoner, Jr.

[57] ABSTRACT

Aflatoxin is removed from seeds or nuts such as peanuts by extraction with methoxymethane.

4 Claims, No Drawings

REMOVAL OF AFLATOXIN FROM PEANUTS

CROSS-REFERENCE TO RELATED APPLICATION

This application is a continuation-in-part of my U.S. application Ser. No. 506,374, filed Sept. 16, 1974, now abandoned.

BACKGROUND OF THE INVENTION

1. Field of the Invention

The present invention relates to removal of aflatoxin from seeds or nuts. More particularly, the invention pertains to the removal of aflatoxin from peanuts by extraction with methoxymethane.

2. Description of the Prior Art

Aflatoxin in seeds or nuts is a poisonous product of metabolic activity of a living organism, probably a fungus. Such poison infects a substantial amount of the peanut crop of the world. The infected peanuts are unsuitable for human or animal consumption. Meat from animals fed on the poisonous peanuts is also contaminated and unfit for human consumption.

Aflatoxin in ground nuts in general and the problems of detoxification have been studied. Ground nut meal has been exposed to ultraviolet radiation, but shows no change in aflatoxin level. Solvents such as acetone, benzene and chloroform have been used. Likewise, ground nut meal has been treated with sulfur dioxide. Since no treatment was completely successful, it was concluded that successful detoxification seemed to have little potentiality and emphasis should be placed on prevention of contamination. See, for instance, Chemical Abstracts 93565(p), Vol. 66, 1967.

The detoxification of aflatoxin in peanut meal by hydrogen peroxide has also been suggested. See, for instance, Chemical Abstracts 104163(j), Vol. 66, 1967. Likewise, the elimination of aflatoxin from peanut meal using a combination of heat treatment in the presence of chemicals such as ammonia and acetone has been suggested. See, for instance, Chemical Abstracts 76557(c), Vol. 70, 1969.

SUMMARY OF THE INVENTION

In accordance with the present invention there is provided an improved method for removal of aflatoxin from seeds or nuts which comprises introducing said seeds or nuts into an extraction zone, contacting the said seeds or nuts with liquid methoxymethane in said extraction zone for a time sufficient to extract aflatoxin from said seeds or nuts and separating methoxymethane extract containing aflatoxin.

The aflatoxin-infected seeds or nuts extracted with methoxymethane in accordance with the invention have the contaminating aflatoxin reduced to a low level which renders the seeds or nuts suitable for consumption, particularly for feed for livestock.

The need for heat treatment previously employed is avoided. Heat-sensitive components of the seeds or nuts are not adversely affected by heat.

Also, the problem of taste, odor and residue characteristics of previous chemical treating agents is avoided. The methoxymethane (MOM) employed in the process of the invention leaves very little residue because of its low boiling point. It is nontoxic and has a low level of taste and odor. The fact that MOM does not form peroxides upon exposure to air (as diethylether does) makes it unusually stable and chemically nonreactive under conditions which might result in the formation of undesirable flavors and odors with the use of other conventional solvents. In addition, MOM is an unusually effective sterilizing agent for bacteria, yeast or mold. Thus, the MOM-treated edible nuts are free of harmful residues as well as microorganisms which may be deleterious to the health of humans.

DESCRIPTION OF THE PREFERRED EMBODIMENT

In the process of the present invention the methoxymethane (MOM) is available in commerce. It is produced in "food grade quality" and has been used as an aerosol propellant with food products such as whipped cream toppings.

Aflatoxin removal in accordance with the process of the present invention is effective with seeds or nuts in general. Many crops such as grain (wheat, rye, barley, etc.) and peanuts where there is some contact with moist soil are subject to aflatoxin contamination. The problem with peanuts is particularly of interest and provides an illustrative embodiment which is preferred for MOM treatment.

The peanuts are usually cleaned and hulled to remove the shells or outer coatings prior to introduction to the extraction zone. If desired, the size of the peanut may be reduced as by crushing. However, it is an advantage of the method of the present invention that such crushing is not necessary and the peanuts may be processed in substantially original size and shape.

Contact times in the extraction zone may vary greatly so long as there is sufficient time for the methoxymethane (MOM) to extract aflatoxin from the peanut. In most cases it is desirable that there be a contact time equivalent to at least about 5 minutes since this amount of time also provides sterilization. The extraction is effectively carried out without heating and thus avoids any adverse effect that heat may have on the taste and texture of the peanuts. However, temperatures may be raised along with pressures suitable to maintain the MOM in liquid form where higher temperatures are desired to provide more efficient extractions. Autogenous pressures are generally sufficient. The MOM extract is easily withdrawn from the peanuts by conventional means such as decantation, centrifugation and filtration, so long as the MOM extract is maintained in liquid form.

The detoxified peanut product is readily freed of any traces of MOM after its removal from the extraction zone. As already mentioned, MOM is volatile and has a low boiling point, which allows it to evaporate quickly from the products.

The following examples are offered in further illustration of the invention. Unless otherwise stated, the proportions are on a weight basis.

EXAMPLES

Example 1

Into a stainless-steel shaker bomb there was charged 980 grams of ground peanuts contaminated with 0–2 parts per billion of aflatoxin. The ground peanuts were extracted with 6 successive treatments of about 2 pounds (about 900 grams) each of methoxymethane. The extractions were carried out at about room temperature and each extraction took from about 10 to 15 minutes with constant shaking. Analysis of the extracts obtained was as follows:

| Extraction | MOM, Pounds | Extraction Time, Min. | Weight of Extract, q. | Total Wt. Extracted |
|---|---|---|---|---|
| 1 | 2 | 10 | 70 | 70 |
| 2 | 2 | 10 | 153 | 223 |
| 3 | 2 | 10 | 123 | 346 |
| 4 | 2 | 10 | 60 | 406 |
| 5 | 2.5 | 15 | 18 | 424 |
| 6 | 2.5 | 15 | 10 | 434 |

The stainless-steel shaker bomb was cleaned out and the extracted peanuts weighed 448 g. Analysis of the aflatoxin contamination by thin-layer chromatography as described in current publications (see, for instance, Official Methods of Analysis of The Association of Official Analytical Chemists (AOAC) 12th Ed. 1975, published by AOAC, Washington, D.C., pg. 465, Method 1 (CB Method) 26.014) gave the following results:

| Aflatoxin (Grid) | Test Results (parts per billion) |
|---|---|
| $B_1$ | 0 |
| $B_2$ | 0 |
| $G_1$ | 0 |
| $G_2$ | 0 |

EXAMPLE 2

The procedure of Example 1 was repeated except that 760 g of ground peanuts contaminated with 150–250 parts per billion of aflatoxin was used. The contaminated peanuts were extracted by five successive extractions using about 1.5 pounds (about 760 grams) of methoxymethane for each extraction. The results of the extractions were as follows:

| Extraction | MOM, Pounds | Extraction Time, Min. | Weight of Extract, q. | Total Wt. Extracted |
|---|---|---|---|---|
| 1 | 1.5 | 15 | 83 | 83 |
| 2 | 1.5 | 15 | 86 | 169 |
| 3 | 1.75 | 15 | 59 | 218 |
| 4 | 1.75 | 15 | 23 | 241 |
| 5 | 1.5 | 15 | 12 | 253 |

The stainless-steel shaker bomb was cleaned out and the extracted peanuts weighed 464 grams. Analysis of the aflatoxin contamination gave the following results:

| Aflatoxin (Grid) | Test Results (parts per billion) |
|---|---|
| $B_1$ | 8.3 |
| $B_2$ | 2.5 |
| $G_1$ | 0 |
| $G_2$ | 2.5 |

The above examples show that aflatoxin-contaminated peanuts are effectively detoxified by treatment with methoxymethane in accordance with the process of the present invention.

While the character of this invention has been described in detail with the above example, this has been done by way of illustration only and without limitation of the invention. It will be apparent to those skilled in the art that modifications and variations of the illustrative examples may be made in the practice of the invention within the scope of the following claims.

What is claimed is:

1. A method for removal of aflatoxin from cleaned and hulled seeds or nuts which comprises introducing said seeds or nuts into an extraction zone, contacting the said seeds or nuts with a liquid solvent consisting essentially of methoxymethane in said extraction zone for a time and a number of treatments sufficient to extract aflatoxin from said seeds or nuts and separating methoxymethane extract in liquid form containing substantially all of said aflatoxin.

2. The method in accordance with claim 1 wherein the seeds or nuts are peanuts.

3. The method in accordance with claim 2 wherein methoxymethane is separated from the extract and recycled.

4. The method in accordance with claim 1 wherein said extraction is carried out in a succession of treatments.